United States Patent
Donderici

(10) Patent No.: US 10,061,047 B2
(45) Date of Patent: Aug. 28, 2018

(54) DOWNHOLE INSPECTION WITH ULTRASONIC SENSOR AND CONFORMABLE SENSOR RESPONSES

(71) Applicant: Halliburton Energy Services, Inc., Houston, TX (US)

(72) Inventor: Burkay Donderici, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 260 days.

(21) Appl. No.: 14/915,874

(22) PCT Filed: Sep. 26, 2014

(86) PCT No.: PCT/US2014/057604
§ 371 (c)(1),
(2) Date: Mar. 1, 2016

(87) PCT Pub. No.: WO2015/050778
PCT Pub. Date: Apr. 9, 2015

(65) Prior Publication Data
US 2016/0327675 A1    Nov. 10, 2016

Related U.S. Application Data

(60) Provisional application No. 61/886,298, filed on Oct. 3, 2013.

(51) Int. Cl.
*G01V 1/48* (2006.01)
*E21B 47/00* (2012.01)
(Continued)

(52) U.S. Cl.
CPC ............ *G01V 1/48* (2013.01); *E21B 47/00* (2013.01); *E21B 47/0002* (2013.01);
(Continued)

(58) Field of Classification Search
CPC . G01V 1/50; G01V 1/48; G01V 1/368; G01V 3/30; E21B 47/00; E21B 47/0002; E21B 47/082; E21B 47/0006; E21B 47/18
(Continued)

(56) References Cited

U.S. PATENT DOCUMENTS 3,066,732 A * 12/1962 McEver ................. E21B 43/38
166/265
4,876,672 A * 10/1989 Petermann .............. E21B 4/003
175/50
(Continued)

FOREIGN PATENT DOCUMENTS

WO    WO-2014139593 A1 *  9/2014 ........... E21B 47/091

OTHER PUBLICATIONS

International Preliminary Report on Patentability issued in related Application No. PCT/US2014/057604, dated Apr. 14, 2016 (22 pages).
(Continued)

*Primary Examiner* — Daniel L Murphy
(74) *Attorney, Agent, or Firm* — Benjamin Fite; Baker Botts L.L.P.

(57) ABSTRACT

An example method for downhole surveying and measuring may include positioning a first conformable sensor proximate to a downhole element. The first conformable sensor may include a flexible material, a transmitter coupled to the flexible material, and a receiver coupled to the flexible material. An ultrasonic sensor may be positioned proximate to the downhole element. The receiver may measure an electrical response of the downhole element to a signal generated by the transmitter. An acoustic response of the downhole element may be measurements at the at the
(Continued)

ultrasonic sensor. The electrical response and the acoustic response may be processed to determine a parameter of the downhole element.

20 Claims, 8 Drawing Sheets

(51) Int. Cl.
*G01V 1/50* (2006.01)
*G01V 3/30* (2006.01)
*E21B 47/08* (2012.01)
*E21B 47/18* (2012.01)
*G01V 1/36* (2006.01)

(52) U.S. Cl.
CPC ........ *E21B 47/0006* (2013.01); *E21B 47/082* (2013.01); *E21B 47/18* (2013.01); *G01V 1/368* (2013.01); *G01V 1/50* (2013.01); *G01V 3/30* (2013.01)

(58) Field of Classification Search
USPC .......................................................... 367/35
See application file for complete search history.

(56) References Cited

U.S. PATENT DOCUMENTS

| 5,198,770 | A | 3/1993 | Decorps et al. |
| 2006/0103389 | A1 | 5/2006 | Bespalov et al. |
| 2009/0195244 | A1 | 8/2009 | Mouget et al. |
| 2010/0097066 | A1 | 4/2010 | Gao |
| 2012/0095686 | A1 | 4/2012 | Legendre et al. |

OTHER PUBLICATIONS

International Search Report and Written Opinion issued in related PCT Application No. PCT/US2014/057604 dated Jan. 9, 2015, 13 pages.
Goldfine, Neil, "Surface-Mounted Eddy-Current Sensors for On-Line Monitoring of Fatigue Tests and for Aircraft Health Monitoring", Second Joint NASA/FAA/DoD Conference on Aging Aircraft, Aug. 1998.
Goldfine, Neil, et al, "Conformable Eddy-Current Sensors and Arrays for Fleetwide Gas Turbine Component Quality Assesment", ASME Journal of Engineering for Gas Turbines and Power, vol. 124, No. 4, pp. 904-909, Oct. 2002.
Goldfine Neil, "MWM-Array Eddy Current Sensors for Detection of Cracks in Regions with Fretting Damage", Materials Evaluation, ASNT, Jul. 2002, vol. 60, No. 7.

* cited by examiner

DOWNHOLE INSPECTION WITH ULTRASONIC SENSOR AND CONFORMABLE SENSOR RESPONSES

CROSS REFERENCE TO RELATED APPLICATIONS

The present application is a U.S. National Stage Application of International Application No. PCT/US2014/057604 filed Sep. 26, 2014, and claims priority to U.S. provisional No. 61/886,298, filed Oct. 3, 2013, titled "DOWNHOLE INSPECTION WITH ULTRASONIC SENSOR AND CONFORMABLE SENSOR RESPONSES," both of which are incorporated herein by reference in their entirety for all purposes.

BACKGROUND

The present disclosure relates generally to downhole drilling operations and, more particularly, to downhole inspection with ultrasonic sensor and conformable sensor responses. Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation. In certain operations, measurements within the wellbore may be generated, including measurements of a casing within the wellbore. Typically, those measurements are limited with respect to their granularity, and small features within the wellbore may not be identifiable through the measurements. Moreover, the casing can interfere with measurements intended to identify elements outside of the casing.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features.

Figure 1:
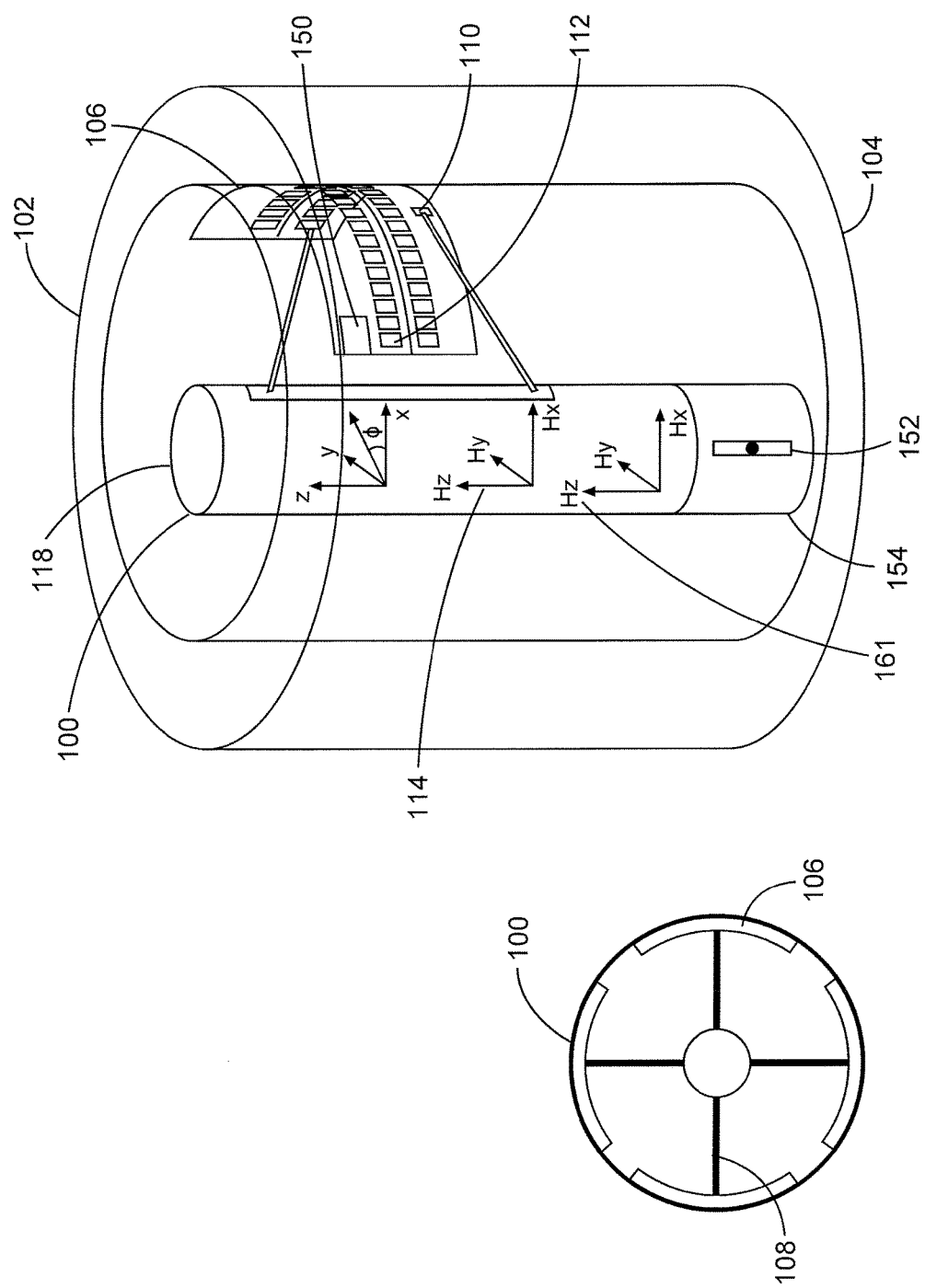
FIG. 1 is a diagram of an example downhole tool with conformable sensors, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to downhole drilling operations and, more particularly, to downhole inspection with ultrasonic sensor and conformable sensor responses.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Modern petroleum drilling and production operations demand information relating to parameters and conditions downhole. Several methods exist for downhole information collection, including logging-while-drilling ("LWD") and measurement-while-drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

Figure 8:
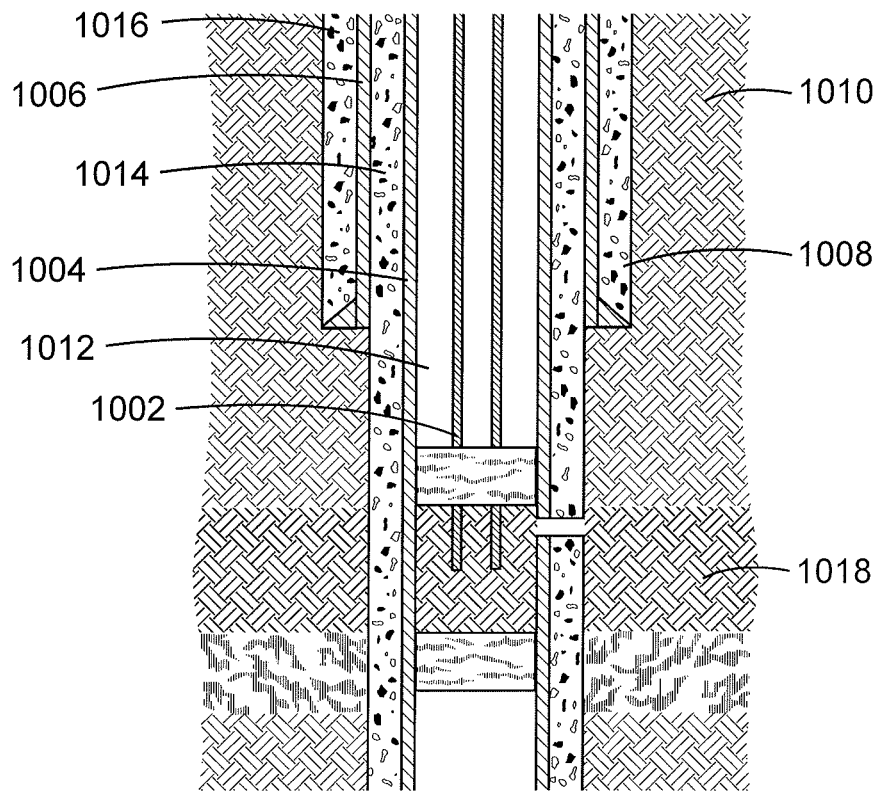
FIG. 8 is a diagram of an example production environment with multiple, concentric casings.

Hydrocarbons may be trapped in porous rock formations thousands of feet below the surface. Recovering the hydrocarbons typically requires drilling a borehole into the porous rock formation so that the hydrocarbons may be pumped to the surface. Metal pipes, referred to as casings, may be secured within the borehole as part of the hydrocarbon recovery operation. FIG. 8 is a diagram of an example production environment and illustrates casings 1002, 1004, and 1006 disposed within a borehole 1008 in a rock formation 1010. The casings 1002-1004 may be concentric or nearly concentric and secured within the borehole 1008 and each other through cement layers 1012, 1014, and 1016. The center casing 1002 may comprise a production casing where hydrocarbon from the formation strata 1018 is received at the surface (not shown).

The casings 1002-1006 may serve numerous purposes within a production and drilling environment, including preventing the borehole 1008 from collapsing after it is drilled and while it is being drilling, protecting a water table in the formation 1010 from contamination, and maintaining pressure within the borehole 1008. Accordingly, damage to the integrity of the casings 1002-1006 is problematic. Common damage to the casings includes crack and corrosion, which can be an indication of a defective cement bond between a casing and the borehole wall. Downhole measurements may be used to survey the casings 1002-1006 to identify damage, but measuring the outer casings 1004-1006 may be difficult because the measurements must be taken from inside casing 1002.

According to aspects of the present disclosure, a downhole tool with at least one ultrasonic sensor at least one conformable sensor may be placed downhole in either an open hole (non-cased) environment or a cased environment, to measure, survey, and inspect downhole elements, such as downhole casings, boreholes, and formations. As used herein, conformable sensors may comprise planar sensors that are printed or disposed on a material that can conform to the shape of a surface with which it is in contact, and may produce high-resolution, azimuthally sensitive responses or measurements that can be used to visualize that surface. Ultrasonic sensor responses may generate similar responses to those produced by the conformable sensors, but with a more limited the azimuthal resolution. As will be described below, the responses from the ultrasonic and conformable sensors may be combined and processed to generate high-resolution, accurate visualizations of downhole elements adjacent to the downhole tool, as well as downhole elements located away from the downhole tool that are otherwise difficult to accurately measure.

FIG. 1 is a diagram that shows two views of an example downhole tool 100 with at least one ultrasonic sensor and at least one conformable sensor, according to aspects of the present disclosure. The downhole tool 100 is shown deployed in concentric pipes 102 and 104, such as in a cased environment. In certain embodiments, the downhole tool 100 may comprise a wireline survey or measurement tool that can be introduced into an open hole (non-cased) environment, a cased environment, or within the bore of a drill string in a conventional drilling assembly. In certain embodiments, the downhole tool 100 may be included in a LWD/MWD segment of a bottom hole assembly (BHA) in a conventional drilling assembly. The tool 100 may be physically and/or communicably coupled to a control unit (not shown) at the surface through a wireline or slickline, or any other conveyance, or through a downhole telemetry systems, such as a mud pulse telemetry system. The tool 100 may also comprise a control unit that is communicably coupled to the sensors of the tool. As used herein, a control unit may include an information handling system or any other device that contains at least one processor communicably coupled to a non-transitory computer readable memory device containing a set of instructions that when executed by the processor, cause it to perform certain actions. Example processors include microprocessors, microcontrollers, digital signal processors (DSP), application specific integrated circuits (ASIC), or any other digital or analog circuitry configured to interpret and/or execute program instructions and/or process data.

At least one conformable sensor 112 may be coupled to a tool body 118 of the downhole tool 100. The conformable sensor 112 may include primary windings or transmitters having extended portions for creating an electromagnetic (EM) field in a target, in this case the pipes 102 and 104, and secondary windings or receivers within the primary winding for measuring the current response generated by the EM field. The measured current response may be processed to identify physical and electrical parameters of the target, as will be described below. The resolution of the measurements taken by the conformable sensor 112 increases as the "standoff" distance between the sensor 112 and the target decreases.

In the embodiment shown, the conformable sensor 112 is one of an array of conformable sensors coupled to a pad 106 that may be extended from the tool body 118 through spring mechanisms or motorized arms 108 to contact the pipe 102. Other locations and arrangements for the conformable sensor 112 are possible and will be described below. The spring mechanisms or motorized arms 108 may similarly establish contact between the pad 106 and a borehole wall in an open hole environment. The elasticity of the pad 106 and tension in the arm 108 may be designed in such a way that the pad 106 will substantially deform to the shape of the pipe 102, decreasing the stand off distance between the sensor 112 and pipe 102 increasing the resolution of the resulting measurements. Other pads similar to pad 106 may be arranged on different sides of the tool 100 to mechanically balance the tool 100 within the pipe 102. In other embodiments, expandable arms may be used opposite the pad 106 to mechanically balance the tool 100. In certain embodiments, the array 110 of conformable sensors may be arranged on the pad 106 to perform sensing at different azimuthal positions with respect to the tool body 118. In embodiments where multiple pads are used, each pad may include an array of conformable sensors to perform sensing at different azimuthal positions, and the pads may be arranged with respect to the tool body 118 such that there is full 360 degree coverage around the tool 100, where one pad covers one set of angles, and other stations cover other sets, providing full coverage.

As stated above, the conformable sensor 112 may include at least one portion that functions as a transmitter and generate electromagnetic (EM) fields in a target, such as the pipe 102, and at least one portion that functions as a receiver that receives and measures the current responses of the target to the generated EM fields. In certain embodiments, the downhole tool 100 may comprise separate transmitters 114 or receivers 116 mounted on the tool body 118. These additional transmitters 114 or receivers 116 may be inductive-type antennas, realized with coils, solenoids or rotating or moving magnets. EM fields may be generated and the corresponding current responses measured with any combination of the transmitter 114, the receiver 116, and the transmitters and receivers within the conformable sensor 112. Notably, when the transmitter is farther away from the receiver, the depth of investigation increases but the measurement resolution decreases.

In certain embodiments, at least one ultrasonic sensor 150 may be coupled to the downhole tool 100. As used herein, an ultrasonic sensor may comprise a sensor that generates ultrasonic pressure waves and/or measures reflected and refracted pressure caused by a target medium, in this case pipe 102. Ultrasonic pressure waves may correspond to frequencies above the audible range of the human ear, or above approximately 20,000 hertz. The ultrasonic sensor 150 may be a transceiver that transmits ultrasonic pressure waves in the form of sound wave packets. The sound wave packets may interact with and be reflected or refracted by the pipes 102 and 104, any cement layers between the pipes 102 and 104, and the formation surrounding the pipes 102 and 104. The ultrasonic sensor 150 may receive and measure the reflections, which may be analyzed and interpreted to determine physical and mechanical properties of the pipes 102 and 104.

In the embodiment shown, the ultrasonic sensor 150 is disposed on pad 106. In certain embodiments, one or more ultrasonic sensors may be located on each pad 106 of the downhole tool 100. One or more ultrasonic sensors may be mounted on the tool body 118 instead of or in addition to the ultrasonic sensor 150 located on the pad 106. In certain embodiments, the downhole tool 100 may comprise a rotating portion 154, and an ultrasonic sensor 152 may be coupled to the rotation portion 154. The rotating portion 154 may be rotated with a motor (not shown) in the tool 100 to scan 360 degrees around the pipes 102 and 104. In certain embodiments, the tool 100 may include centralizers instead of or in addition to pads 106 to centralize the tool for more stable operation. Additionally, in the case that the downhole tool 100 is incorporated into an LWD/MWD segment of a drill string, an ultrasonic sensor may be incorporated in another section of the tool string and the measurements from the ultrasonic sensors can be related to those from the conformable sensors by utilizing appropriate depth shifting.

In use, the downhole tool 100 may generate high-resolution, azimuthal measurements of the pipe 102 by placing the pad 106 in contact with the pipe 102 and transmitting a time-varying EM signal from a transmitter of the conformable sensor 112. The signal may generate eddy currents in the pipe 102. The eddy currents may generate secondary currents that contain information about the pipe 102, and the secondary currents may be measured at some or all of the receivers of the conformable sensor 112. Conversely, the downhole tool 100 may generate low-resolution measurements of the pipe 104 by transmitting a time-varying EM signal from transmitter 114 and measuring the current response of the pipe 104 at one or more receivers of the conformable sensor 112. Separately from or in conjunction with the measurements by the conformable sensor, the ultrasonic sensor 150 may transmit an ultrasonic pressure signal and receive the reflections from pipes 102 and 104 and other downhole elements.

Figure 2:
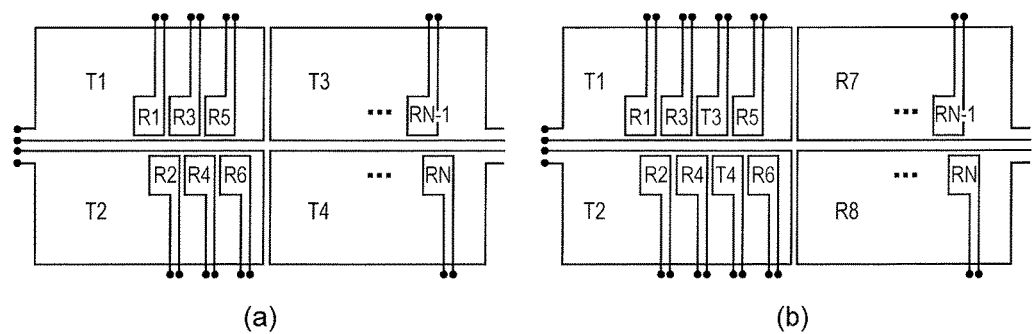
FIG. 2 is a diagram of example antenna windings for a conformable sensor, according to aspects of the present disclosure.

FIG. 2 is a diagram of two example antenna windings for a conformable sensor, according to aspects of the present disclosure. In configuration (a), the windings include transmitters T1-T4 and staggered receivers R1-RN, with the area of the transmitters T1-T4 larger than the area of the receivers R1-RN. The transmitters T1-T4 may comprise primary windings, while the staggered receivers R1-RN may comprise secondary windings. The number and size of the receiver pairs may determine the granularity and resolution of the measurements. Staggering the receivers may double the azimuthal resolution of the sensor since more measurements are made per azimuthal position. In configuration (b), the windings also include transmitters T1-T4 and receivers R1-RN, but the transmitters T1-T4 and receivers R1-RN may be mixed with regard to their size and relative configurations. Configuration (b) may produce more spatially diverse information with varying resolution, depths of investigation and signal levels. Other transmitter and receiver arrangements are possible within the scope of this disclosure.

The windings in both configuration (a) and configuration (b) may comprise the windings for a single conformable sensor, formed by circuit printing or other deposition methods on a flexible surface (not shown). In certain embodiments, an array of conformable sensors may be formed using multiple individual sensors on separate flexible surfaces, or by printing or disposing an array of individual sensor windings on one flexible surface. Ports of the transmitting and receiving windings (shown as circles) may be electrically connected to transmitter and receiver boards (not shown) that cause the transmitters T1-T4 to generate signals and cause the receivers R1-RN to measure the current responses caused by the generated signals. In certain embodiments, one or more of the transmitters T1-T4 may generate a signal in a target, and each of the receivers R1-RN may separately measure the response of the target to the signal. In certain embodiments, the combinations of transmitters and receivers used to generate EM signals and measure current responses may be varied dynamically by a control unit coupled to the transmitters T1-T4 and receivers R1-RN.

Figure 3:
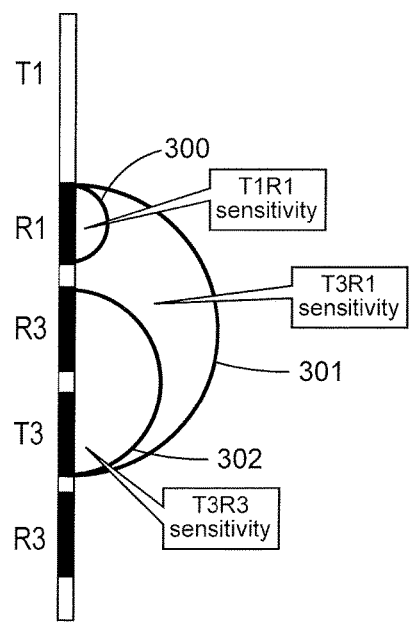
FIG. 3 is a diagram of example depths of investigation for antenna windings of a conformable sensor, according to aspects of the present disclosure.

As described above, the distance between the transmitters and the receivers on a conformable sensor may affect the resolution of the resulting measurement and the depth of investigation covered by that measurement. FIG. 3 is a diagram illustrating different depths of investigation for combinations of transmitters and receivers on a conformable sensor, according to aspects of the present disclosure. As can be seen, FIG. 3 illustrates two transmitters T1 and T3 and three receivers R1, R3, and R5. The arrangement of the transmitters T1 and T3 and three receivers R1, R3, and R5 may correspond to configuration (b) in FIG. 2, with the windings for transmitter T3 and receivers R1, R3, and R5 located within the winding of transmitter T1.

The curved lines extending from the transmitters and receivers show the depths of investigation for select transmitter and receiver pairs, with the size of the curved lines depending on the distance between the transmitter and the receiver. Curved line 300 shows the depth of investigation for a measurements taken using the transmitter T1 and the receiver R1. Curved line 301 shows the depth of investigation for a measurements taken using the transmitter T3 and the receiver R1. Curved line 302 shows the depth of investigation for a measurements taken using the transmitter T3 and the receiver R2. Notably, the larger the depth of investigation for a transmitter and receiver pair, the more area or volume that must be measured, causing a lower resolution measurement.

As can be seen, the curved line 300 extends the smallest distance from the transmitters and receivers, indicating the smallest depth of investigation and the highest resolution out of the three select transmitter and receiver pairs. This is because the distance between the receiver R1 and transmitter T1 is negligible due to the overlapping windings, leading to an localized, high-resolution measurement. Curved line 301 is the largest, in contrast, because the distance between the transmitter T3 and the receiver R1 is the largest. The resulting measurement will also have the lowest resolution.

In practice the conformable sensor containing the transmitters T1 and T3 and receivers R1, R3, and R5 may be pressed against a first pipe or borehole. Measurements taken using the transmitter T1 and the receiver R1 may provide high-resolution information on the area of the pipe or borehole in immediate contact with the conformable sensor. Measurements taken using the transmitter T3 and the receiver R1 and transmitter T3 and the receiver R3 may provide lower resolution images of the area of the pipe or borehole in immediate contact with the conformable sensor, but may provide additional information regarding characteristics apart from the conformable sensor. Additionally, measurements taken using the transmitter T3 and the receiver R1 may provide information of elements remote from the conformable sensor, such as a second pipe concentric with and outside of the first pipe.

Figure 4:
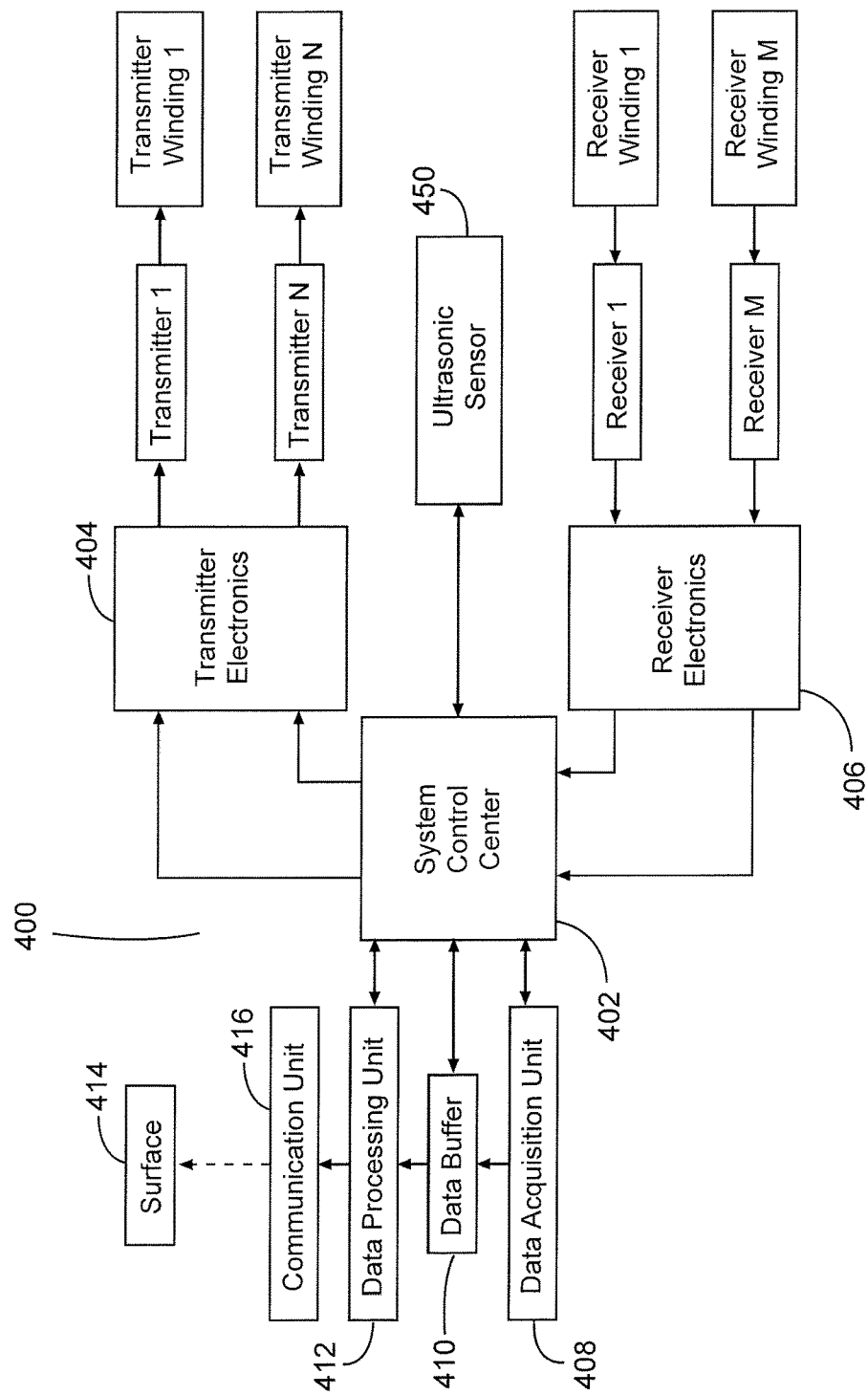
FIG. 4 is a diagram of an example control system for a downhole tool with conformable sensors and ultrasonic sensors, according to aspects of the present disclosure.

In certain embodiments, a control system associated with the downhole tool may control when and how the conformable sensor and ultrasonic sensor capture measurement. FIG. 4 is a diagram of an example control system 400 for a downhole tool with at least one ultrasonic sensors and a conformable sensor array, according to aspects of the present disclosure. The system 400 comprises a control unit 402 that may function as the primary controller for the tool and may be communicably coupled to transmitters 1-N through transmitter electronics 404, to receivers 1-M through receiver electronics 306, to ultrasonic sensor 450, and to mechanical, electrical or hydraulic elements 430 coupled to and configured to extend pads to which the transmitters 1-N and receivers 1-M coupled. The transmitters 1-N and receivers 1-M may comprise elements of a conformable sensor or an array of conformable sensors. The transmitter electronics 404 and receiver electronics 406 may comprise circuit boards to which some or all of the transmitters 1-N and receivers 1-M are coupled.

The control unit 402 may trigger the transmitter electronics 404 to generate a time-varying EM signal through one or more of the transmitters 1-N. The time-varying signal may be a sinusoidal signal, its phase and amplitude set at a desired value. As is described above, the EM signals generated through the transmitters 1-N may be coupled to and generate eddy currents in the pipe or borehole contact with the conformable sensors, and the eddy currents may generate secondary currents that contain information about the pipe or borehole. The secondary currents generated by one or more of the transmitters 1-N of the conformable sensor array may be measured at the receivers 1-M. In the case of a frequency domain operation, the measurements from the receivers 1-M may be represented as voltage or current numbers in complex domain with real and imaginary parts, in phasor domain as amplitude and phase, or any other domain that can be obtained by analytical mapping from any of these domains. In the case of a time domain operation, the measurements from the receivers 1-M may be represented as magnitudes as a function of time which can be positive or negative. Results from time and frequency domain can be transferred from one to another by using Fourier transform or inverse Fourier transform.

Like the transmitters 1-N and receivers 1-M, the ultrasonic sensor 450 may be triggered by the control unit 402. The control unit 402 may send control signals to the ultrasonic sensor 450, identifying the pressure wave frequency to generate, how often the pressure waves should be generated, and when the measurements should be taken. As described above, the ultrasonic sensor 450 may comprise a transceiver that is capable of both producing ultrasonic signals and measuring their echoes.

The control unit 402 may receive measurements from the receivers 1-N through the receiver electronics 406 and measurements from the ultrasonic sensor 450, and may transmit the measurements to the data acquisition unit 408. For a specific transmitter excitation, measurements from multiple receivers can be generated and received at the same time. Similarly, multiple transmitters 1-N can be excited at the same time and they can be time, frequency or jointly multiplexed for latter demultiplexing operation at the receivers. Upon reception at the data acquisition unit 408, the measurements may be digitized, stored in a data buffer 410, preprocessed at data processing unit 412, and sent to the surface 414 through a communication unit 416, which may comprise a downhole telemetry system.

In certain embodiments, the control system 400, and in particular the control unit 402 may be responsible for controlling the pairs of transmitters and receivers from the conformable sensors that generate measurements. In certain embodiments, the control system 400 may select transmitter and receiver pairs that provide sufficient depth of investigation to measure remote casings or pipes. The control unit 402 may include instructions regarding the transmitter and receivers pairs to use in given circumstances, and may generate control signals to the transmitter electronics and receiver electronics based, at least in part, on the instructions. For example, the control unit 402 may include instructions for shallow measurements using co-located or closely located transmitters and receivers and for deep measurements using transmitters and receivers located farther away from each other.

According to aspects of the present disclosure, the data measurements from the conformable sensor and ultrasonic sensor of the downhole tool may be aggregated and processed to produce a visualization of one or more downhole elements. As will be described below, the combination of conformable sensor and ultrasonic sensor responses may improve the resolution of resulting images, including the resolution of images for downhole elements located away from the downhole tool, such as outer pipes in a concentric pipe environment. In certain embodiments, aggregating and processing the measurements may comprise aggregating and processing the measurements using a control unit located either within the downhole tool or the surface above the downhole tool. When processed at the surface, the measurements may be communicated to the surface in real time, such as through a wireline, or stored in a downhole tool and later processed when the tool is retrieved to the surface. In certain embodiments, aggregating and processing the measurements may comprise aggregating and processing the measurements using an inversion algorithm implemented as a set of instructions in the control unit that are executable by a processor of the control unit to perform data calculations and manipulations necessary for the inversion algorithm.

Figure 5:
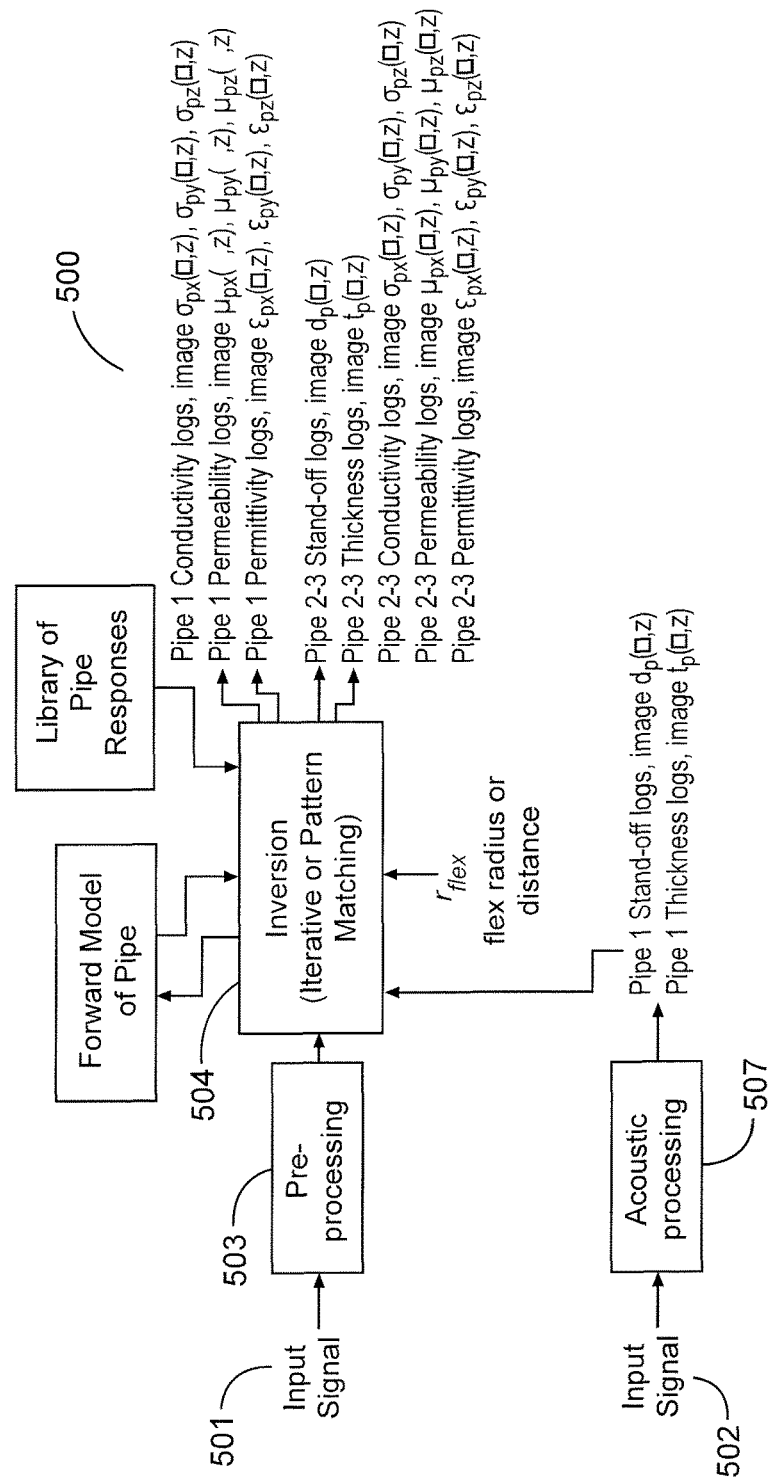
FIG. 5 is a block diagram of an example inversion algorithm for a downhole environment with one or more pipes.

FIG. 5 is a block diagram of an example inversion algorithm 500 for a downhole environment with a plurality of pipes, according to aspects of the present disclosure. The inversion algorithm may comprise two sets of input signals, input signal 501 from the conformable sensors and input signal 502 from the ultrasonic sensors. The input signals 501 and 502 may reflects different depths or measurements, different time periods, and may be indexed according to the pipes of the downhole environment to which they correspond. For ease of explanation, the pipe closest to the downhole tool when measurements are taken may be referred to as pipe 1, the next closest pipe may be referred to as pipe 2, and the farthest pipe may be referred to as pipe 3.

The inversion algorithm 500 may comprise a pre-processing block 503, which may receive the input signals 501. The pre-processing block 503 may process the input signals 501 to compensate for downhole conditions or to convert the input signals to a form usable within the inversion block 504. For example, the pre-processing block 503 may process the measurements to calibrate for temperature effects, convert between frequency to time domain, convert between complex-value to phase and amplitudes, and/or to remove noise by filtering in azimuth or depth.

The inversion algorithm 500 further may comprise the inversion block 504, which may receive and process the signals from the pre-processing block 503 to identify physical and/or electrical parameters of the pipes of the downhole environment. In certain embodiments, the inversion block 504 may receive a model 505 of a downhole environment with a plurality of pipes. The inversion block 504 may implement a cost function to identify physical and/or electrical parameters of the pipes that produce the minimum mismatch between the model 505 and the input signal 501. The cost function may be defined, for example, by utilizing least squares minimization through $L_2$ norm.

In certain embodiments, a library 506 of pipe responses from other tool measurements that can be used instead of or in addition to the model 505. For example, the library 506 may be used if the parameter dimensions of the pipe responses are low in number and also small in range, so that an accurate library can be calculated. If library 506 is used, a multi-dimensional interpolation can be used to obtain the parameters corresponding to the responses that most closely match the input signal 501.

The inversion block 504 may output one of more physical and/or electrical parameters of the pipes measured by the downhole tool. For example, the inversion block 504 may output electrical parameters—such as conductivity, permeability, and permittivity—for each of pipes 1-3. In certain embodiments, the inversion block 504 may also output physical parameters of pipes 2 and 3, but not the physical parameters of the pipe 1. Example physical parameters include a stand-off distance between the downhole tool and a pipe, and the thickness of a pipe.

In certain embodiments, the physical parameters of pipe 1 may be generated using input signal 502 from the ultrasonic sensors, which may correspond to acoustic responses measured by the ultrasonic sensors. The input signals 502 may be processed at an acoustic processing element 507 to produce the stand-off and thickness parameters for pipe 1. The stand-off and thickness parameters may be calculated using the reflection times measured by the ultrasonic sensors. In certain embodiments, the stand-off and thickness parameters may be used as known values or constraints within inversion block 504. For example, the parameters may be used to identify the stand-off distance between the conformable sensors and pipe 1 in the inversion block 504, or may provide a range about which the stand-off distance to pipe 1 can be calculated from the input signals 501, which can in turn be used to calculate the physical and electrical parameters for pipes 2 and 3. Accordingly, by using a combination of ultrasonic and electromagnetic measurements, more robust and accurate measurements of pipes 2 and 3 can be obtained.

In certain embodiments the inversion block 504 may output logs of the parameters that may be used to produce visualizations of pipes 1-3. Visualizations of the parameters can be generated and used to identify features of the pipes, such as cracks or corrosion. Notably, because of the resolution of the conformable sensors, the resulting visualizations may have high-resolution and azimuthal sensitivity, indicating very small changes in the pipe parameters that correspond to very small features (on the order of 0.1 inches) on the pipe in direct contact with the conformable sensor. In a multi-pipe environment, where measurements are made on more than one pipe, the resulting measurements may be indexed to identify the corresponding pipe.

Figure 6:
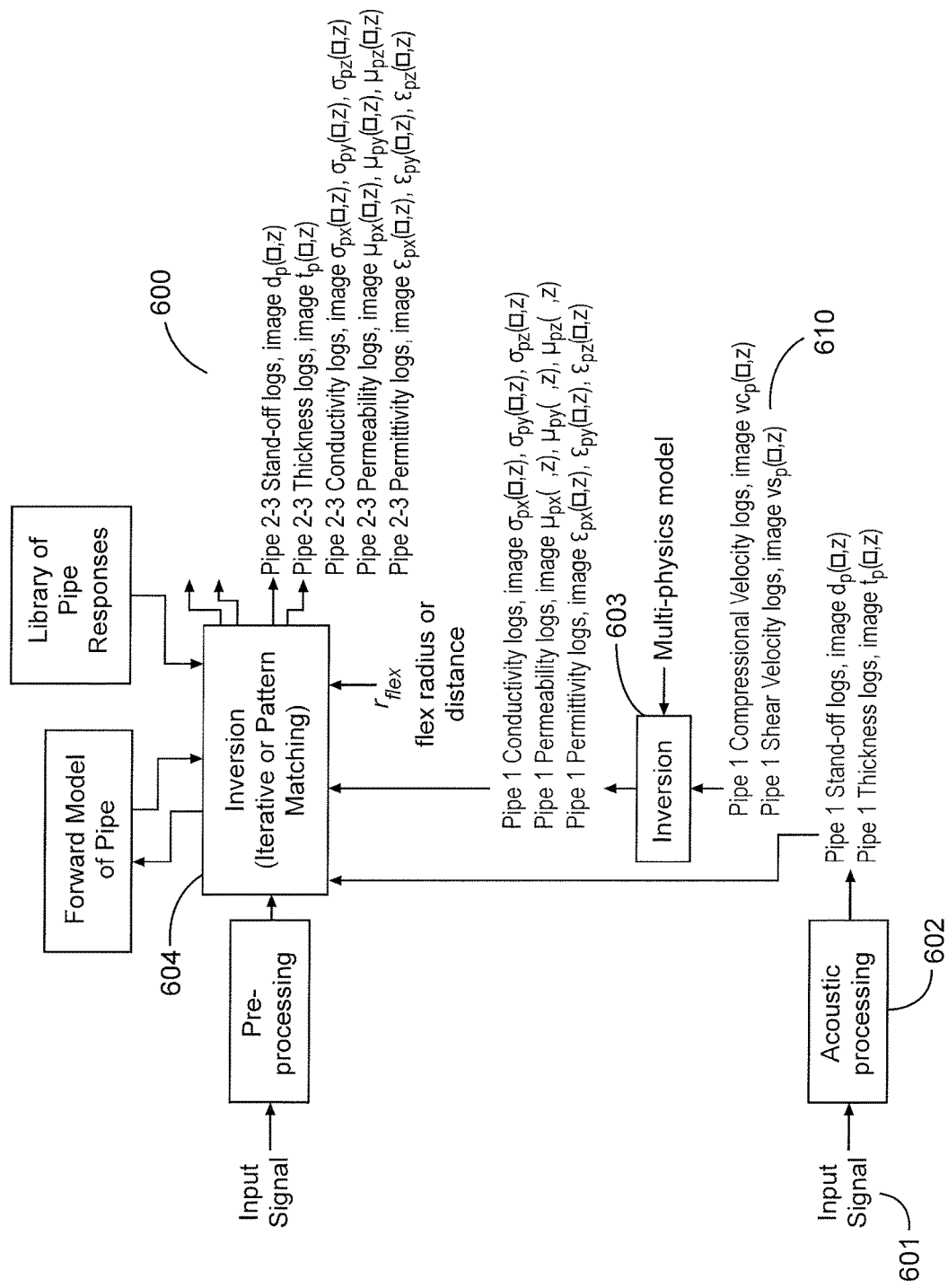
FIG. 6 is a block diagram of another example inversion algorithm for a downhole environment with one or more pipes.

FIG. 6 is a block diagram of another example inversion algorithm 600 for a downhole environment with one or more pipes, according to aspects of the present disclosure. As can be seen, the inversion algorithm 600 comprises similar features to inversion algorithm 500, including how the input signals 601 from the ultrasonic sensors are used to calculate the stand-off and thickness of pipe 1. The inversion algorithm 600 differs, however, because the acoustic processing block 602 may further calculate mechanical parameters 610 of pipe 1, the mechanical parameters 610 including one or more of the compressional velocity and/or the shear velocity of the pipe.

In certain embodiments, the mechanical parameters 610 may be received at an acoustic inversion element 603 of the inversion algorithm 600. The acoustic inversion element 603 may use the mechanical parameters 610 to analyze pipe 1 and generate electrical parameters for that pipe. In certain embodiments, the acoustic inversion algorithm 603 may calculate the electrical parameters using a multi-physics model that relates the mechanical parameters of a pipe to the electrical parameters of the pipe. The multi-physics model may be generated either in a laboratory or in-situ by using reference measurements which can be made by the conformable sensors alone. After the electrical parameters for pipe 1 are generated by the acoustic inversion element 603, they may be used as known parameters or constraints within inversion block 604 to generate physical and electrical parameters of pipes 2 and 3.

Figure 7:
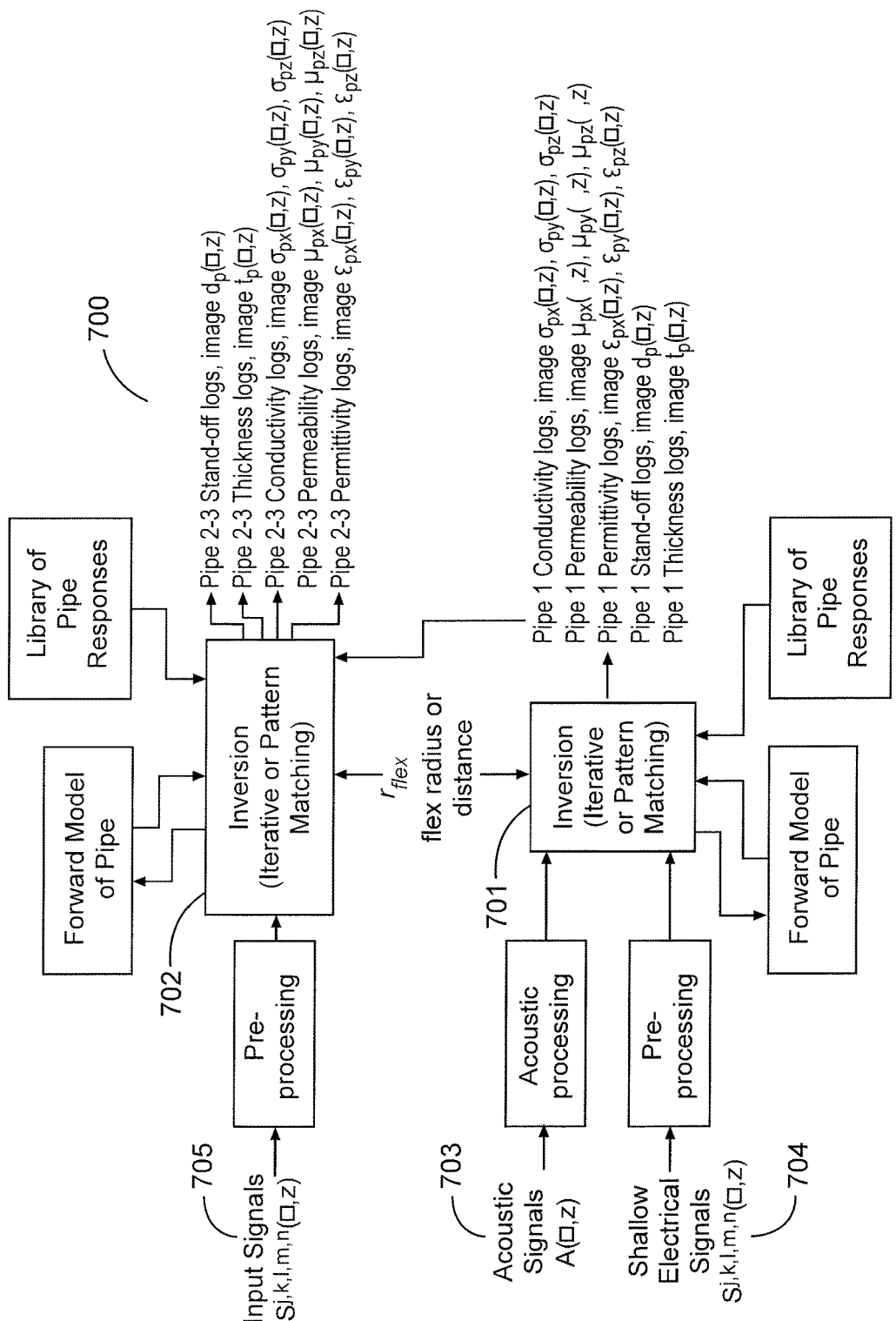
FIG. 7 is a block diagram of another example inversion algorithm for a downhole environment with one or more pipes.

FIG. 7 is a block diagram of another example inversion algorithm 700, according to aspects of the present disclosure. The inversion algorithm 700 may utilize two separate inversion blocks 701 and 702 to process responses from the conformable sensors and generate pipe parameters. Inversion block 701 may receive input 703 corresponding to acoustic responses generated by ultrasonic sensors and input 704 corresponding to shallow electrical responses measured using conformable sensors. As described above, shallow responses may correspond to localized measurements using co-located or closely located transmitters and receivers of a conformable sensor. Inversion block 701 may generate physical and electrical parameters of pipe 1, based at least in part on a downhole model and a library, as described above.

Inversion block 702 may receive input 705, corresponding to deep electrical responses measured using conformable sensors. As described above, deep responses may correspond to deep measurements taken using transmitters and receivers of conformable sensors that are spaced apart. Inversion block 702 may generate physical and electrical parameters for pipes 2-3. The physical and electrical parameters of pipe 1 may be incorporated as known values or constraints within inversion block 702, producing more accurate values for the physical and electrical parameters of pipes 2 and 3.

In certain embodiments, a subset of the inversion algorithms described above may be applied at any depth of measurement, and the results can be consolidated to obtain a single pipe parameter image. Additionally, the more than one algorithm may be used, and the results analyzed to select the one that produced the most accurate results. The selected algorithm result may be used in a consolidation process. Alternatively, separate images for each inversion algorithm can be produced and a user can manually make the decision on which one to use at each depth within the downhole environment.

Figure 9:
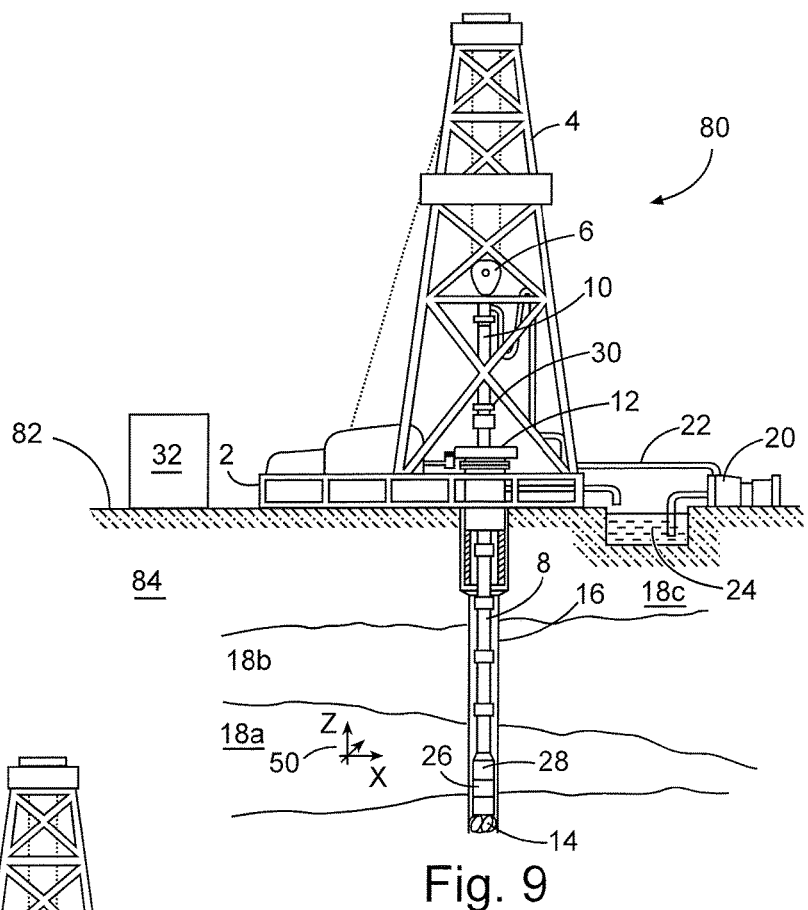
FIG. 9 is a diagram showing an illustrative logging while drilling environment, according to aspects of the present disclosure.

FIG. 9 is a diagram of a subterranean drilling system 80 incorporating a downhole tool 26 with conformable sensors arranged in a radial array, according to aspects of the present disclosure. The drilling system 80 comprises a drilling platform 2 positioned at the surface 82. In the embodiment shown, the surface 82 comprises the top of a formation 84 containing one or more rock strata or layers 18a-c, and the drilling platform 2 may be in contact with the surface 82. In other embodiments, such as in an off-shore drilling operation, the surface 82 may be separated from the drilling platform 2 by a volume of water.

The drilling system 80 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16.

The drilling system 80 may comprise a bottom hole assembly (BHA) coupled to the drill string 8 near the drill bit 14. The BHA may comprise various downhole measurement tools and sensors and LWD and MWD elements, including the downhole tool 26 with a radial array of conformable sensors extending from the tool 26. As the bit extends the borehole 16 through the formations 18, the tool 26 may collect measurements relating to borehole 16 and formation the resistivity of the formation 84. In certain embodiments, the orientation and position of the tool 26 may be tracked using, for example, an azimuthal orientation indicator, which may include magnetometers, inclinometers, and/or accelerometers, though other sensor types such as gyroscopes may be used in some embodiments.

The tools and sensors of the BHA including the tool 26 may be communicably coupled to a telemetry element 28. The telemetry element 28 may transfer measurements from tool 26 to a surface receiver 30 and/or to receive commands from the surface receiver 30. The telemetry element 28 may comprise a mud pulse telemetry system, and acoustic telemetry system, a wired communications system, a wireless communications system, or any other type of communications system that would be appreciated by one of ordinary skill in the art in view of this disclosure. In certain embodiments, some or all of the measurements taken at the tool 26 may also be stored within the tool 26 or the telemetry element 28 for later retrieval at the surface 82.

In certain embodiments, the drilling system 80 may comprise a surface control unit 32 positioned at the surface 102. The surface control unit 32 may be communicably coupled to the surface receiver 30 and may receive measurements from the tool 26 and/or transmit commands to the tool 26 though the surface receiver 30. The surface control unit 32 may also receive measurements from the tool 26 when the tool 26 is retrieved at the surface 102. As is described above, the surface control unit 32 may process some or all of the measurements from the tool 26 to determine certain parameters of downhole elements, including the borehole 16 and formation 84, and may also generate visualizations of the borehole 16 and formation 84 based, at least in part, on the determined parameters through which features of the downhole elements, such as cracks and fractures, may be identified.

Figure 10:
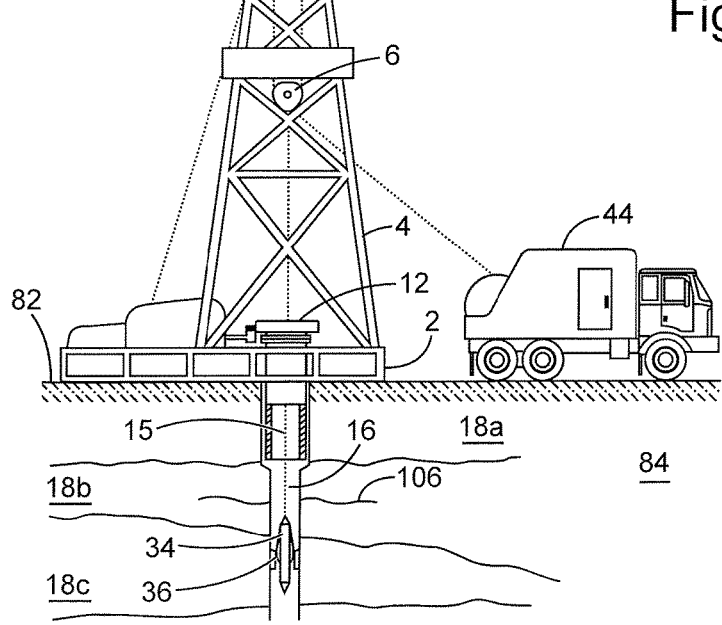
FIG. 10 is a diagram showing an illustrative wireline logging environment, according to aspects of the present disclosure.

At various times during the drilling process, the drill string 8 may be removed from the borehole 16 as shown in FIG. 10. Once the drill string 8 has been removed, measurement/logging operations can be conducted using a wireline tool 34, i.e., an instrument that is suspended into the borehole 16 by a cable 15 having conductors for transporting power to the tool and telemetry from the tool body to the surface 102. The wireline tool 34 may comprise a downhole tool 36 having a radial array of conformable sensors, similar to the tool 26 described above. The tool 36 may be communicatively coupled to the cable 15. A logging facility 44 (shown in FIG. 8 as a truck, although it may be any other structure) may collect measurements from the tool 36, and may include computing facilities (including, e.g., a control unit/information handling system) for controlling, processing, storing, and/or visualizing the measurements gathered by the tool 36. The computing facilities may be communicatively coupled to the tool 36 by way of the cable 15. In certain embodiments, the control unit 32 may serve as the computing facilities of the logging facility 44.

An example method for downhole surveying and measuring may include positioning a first conformable sensor proximate to a downhole element. The first conformable sensor may include a flexible material, a transmitter coupled to the flexible material, and a receiver coupled to the flexible material. An ultrasonic sensor may be positioned proximate to the downhole element. The receiver may measure an electrical response of the downhole element to a signal generated by the transmitter. An acoustic response of the downhole element may be measured with the ultrasonic sensor. The electrical response and the acoustic response may be processed to determine a parameter of the downhole element.

In certain embodiments, positioning the first conformable sensor proximate to the downhole element comprises extending from a downhole tool a pad to which the first conformable sensor is coupled. In certain embodiments, positioning the ultrasonic sensor proximate to the downhole element comprises extending from a downhole tool a pad to which the ultrasonic sensor and the first conformable sensor is coupled. In certain embodiments, positioning the ultrasonic sensor proximate to the downhole element comprises positioning proximate the downhole element a downhole tool with a rotating portion to which the ultrasonic sensor is coupled.

In any of the embodiments of the preceding two paragraphs, the first conformable sensor may comprise one of an array of conformable sensors coupled to the pad. In any of the embodiments of the preceding two paragraphs, the parameter may comprise at least one of an electrical parameter and a physical parameter of the downhole element. In any of the embodiments of the preceding two paragraphs, processing the electrical response and the acoustic response to determine a parameter of the downhole element may comprise processing the electrical response and the acoustic response using at least one inversion algorithm. In any of the embodiments of the preceding two paragraphs, the method may further comprise generating a visualization of the downhole element based at least in part on the determined parameter In certain embodiments, the downhole element may comprise at least a first pipe and a second pipe concentric with the first pipe, and processing the electrical response and the acoustic response to determine a parameter of the downhole element comprises processing the electrical response and the acoustic response to determine a first parameter of a first pipe and a second parameter of the second pipe.

According to aspects of the present disclosure, an example system for downhole surveying and measuring comprises a downhole tool with a tool body and a conformable sensor coupled to the tool body. The conformable sensor may comprise a flexible material, a transmitter coupled to the flexible material, and a receiver coupled to the flexible material. An ultrasonic sensor may be coupled to the downhole tool. The tool may further comprise a control unit comprising a processor and a memory device coupled to the processor, the memory device containing a set of instructions that, when executed by the processor, causes the processor to measure at the receiver an electrical response of a downhole element to a signal generated by the transmitter; and receive from the ultrasonic sensor an acoustic response of the downhole element.

In certain embodiments, the system may further comprise a pad extendable from the tool body, wherein the conformable sensor is coupled to the pad. In certain embodiments the ultrasonic sensor may be coupled to the pad. In certain embodiments, the downhole tool may comprise a rotating portion and the ultrasonic sensor is coupled to the rotating portion.

In any embodiments of the preceding two paragraphs, the conformable sensor may comprise one of an array of conformable sensors coupled to the pad. In any embodiments of the preceding two paragraphs, the set of instructions further may cause the processor to process the electrical response and the acoustic response to determine a parameter of the downhole element, and the parameter may comprise at least one of an electrical parameter and a physical parameter of the downhole element. In certain embodiments, the downhole element may comprises at least a first pipe and a second pipe concentric with the first pipe, and the set of instructions that cause the processor to process the electrical response and the acoustic response to determine a parameter of the downhole element further may cause the processor to process the electrical response and the acoustic response to determine a first parameter of a first pipe and a second parameter of the second pipe. In any embodiments of the preceding two paragraphs, the set of instructions that cause the processor to process the electrical response and the acoustic response to determine a parameter of the downhole element further may cause the processor to process the electrical response and the acoustic response using at least one inversion algorithm. In any embodiments of the preceding two paragraphs, the set of instructions further may cause the processor to generate a visualization of the downhole element based at least in part on the determined parameter.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the element that it introduces.

What is claimed is:

1. A method for downhole surveying and measuring, comprising:
    positioning a first conformable sensor proximate and conformable to a downhole element, the first conformable sensor including:
        a flexible material conformable to the downhole element;
        a transmitter coupled to the flexible material; and
        a receiver coupled to the flexible material;
    positioning an ultrasonic sensor proximate to the downhole element;
    measuring with the receiver an electrical response of the downhole element to a signal generated by the transmitter;
    measuring an acoustic response of the downhole element with the ultrasonic sensor; and
    processing the electrical response and the acoustic response to determine a parameter of the downhole element.

2. The method of claim 1, wherein positioning the first conformable sensor proximate to the downhole element comprises extending from a downhole tool a pad to which the first conformable sensor is coupled.

3. The method of claim 2, wherein the first conformable sensor comprises one of an array of conformable sensors coupled to the pad.

4. The method of claim 1, wherein positioning the ultrasonic sensor proximate to the downhole element comprises extending from a downhole tool a pad to which the ultrasonic sensor and the first conformable sensor are coupled.

5. The method of claim 1, wherein positioning the ultrasonic sensor proximate to the downhole element comprises positioning proximate the downhole element a downhole tool with a rotating portion to which the ultrasonic sensor is coupled.

6. The method of claim 1, wherein the parameter comprises at least one of an electrical parameter and a physical parameter of the downhole element.

7. The method of claim 6, wherein
    the downhole element comprises at least a first pipe and a second pipe concentric with the first pipe; and
    processing the electrical response and the acoustic response to determine a parameter of the downhole element comprises processing the electrical response and the acoustic response to determine a first parameter of a first pipe and a second parameter of the second pipe.

8. The method of claim 1, wherein processing the electrical response and the acoustic response to determine a parameter of the downhole element comprises processing the electrical response and the acoustic response using at least one inversion algorithm.

9. The method of claim 1, further comprising generating a visualization of the downhole element based at least in part on the determined parameter.

10. The method of claim 9, wherein the downhole element comprises at least a first pipe and a second pipe concentric with the first pipe.

11. A system for downhole surveying and measuring, comprising:
    a downhole tool with a tool body;
    a conformable sensor coupled and conformable to a downhole element, the sensor comprising
        a flexible material conformable to the downhole element;
        a transmitter coupled to the flexible material; and
        a receiver coupled to the flexible material;
    an ultrasonic sensor coupled to the downhole tool; and
    a control unit comprising a processor and a memory device coupled to the processor, the memory device containing a set of instructions that, when executed by the processor, causes the processor to
        measure via the receiver an electrical response of the downhole element to a signal generated by the transmitter; and
        receive from the ultrasonic sensor an acoustic response of the downhole element.

12. The system of claim 11, further comprising a pad extendable from the tool body, wherein the conformable sensor is coupled to the pad.

13. The system of claim 12, wherein the ultrasonic sensor is coupled to the pad.

14. The system of claim 12, wherein the conformable sensor comprises one of an array of conformable sensors coupled to the pad.

15. The system of claim 11, wherein the downhole tool comprises a rotating portion and the ultrasonic sensor is coupled to the rotating portion.

16. The system of claim 11, wherein
    the set of instructions further cause the processor to process the electrical response and the acoustic response to determine a parameter of the downhole element; and
    the parameter comprises at least one of an electrical parameter and a physical parameter of the downhole element.

17. The system of claim 16, wherein
    the downhole element comprises at least a first pipe and a second pipe concentric with the first pipe; and
    the set of instructions that cause the processor to process the electrical response and the acoustic response to determine a parameter of the downhole element further causes the processor to process the electrical response and the acoustic response to determine a first parameter of a first pipe and a second parameter of the second pipe.

18. The system of claim 11, the set of instructions that cause the processor to process the electrical response and the acoustic response to determine a parameter of the downhole element further causes the processor to process the electrical response and the acoustic response using at least one inversion algorithm.

19. The system of claim 11, wherein the set of instructions further cause the processor to generate a visualization of the downhole element based at least in part on the determined parameter.

20. The system of claim 19, wherein the downhole element comprises at least a first pipe and a second pipe concentric with the first pipe.

* * * * *